US012738676B2

(12) United States Patent
Wettenstein et al.

(10) Patent No.: US 12,738,676 B2
(45) Date of Patent: Sep. 15, 2026

(54) CONNECTOR FOR FLEXIBLE CIRCUITRY ELECTRICAL INTERFACE

(71) Applicant: Spark Biomedical, Inc., Dallas, TX (US)

(72) Inventors: Jared Wettenstein, League City, TX (US); Alejandro Covalin, Los Angeles, CA (US); Ryan Clingan, Houston, TX (US); Terry Douglas Daglow, Houston, TX (US)

(73) Assignee: Spark Biomedical, Inc., Dallas, TX (US)

( * ) Notice: Subject to any disclaimer, the term of this patent is extended or adjusted under 35 U.S.C. 154(b) by 416 days.

(21) Appl. No.: 18/371,986

(22) Filed: Sep. 22, 2023

(65) Prior Publication Data

US 2024/0106142 A1 Mar. 28, 2024

Related U.S. Application Data

(60) Provisional application No. 63/409,453, filed on Sep. 23, 2022.

(51) Int. Cl.
*H01R 12/61* (2011.01)
*H01R 12/59* (2011.01)
(Continued)

(52) U.S. Cl.
CPC ......... *H01R 12/613* (2013.01); *H01R 12/592* (2013.01); *H01R 12/7064* (2013.01);
(Continued)

(58) Field of Classification Search
CPC .... H01R 12/613; H01R 12/89; H01R 12/592; H01R 12/7064; H01R 12/7076;
(Continued)

(56) References Cited

U.S. PATENT DOCUMENTS 3,895,635 A * 7/1975 Justus ...................... A61N 1/04 439/864
4,900,268 A 2/1990 Kunishi
(Continued)

FOREIGN PATENT DOCUMENTS

| | | | |
|---|---|---|---|
| EP | 0961352 | 5/2008 | |
| WO | WO-9619017 A1 * | 6/1996 | ............. H01R 11/24 |
| WO | 2012/115282 | 8/2012 | |

*Primary Examiner* — Tulsidas C Patel
*Assistant Examiner* — Carlos E Lopez-Pagan
(74) *Attorney, Agent, or Firm* — Secant IP, P.L.L.C.

(57) ABSTRACT

In an illustrative embodiment, a connector for interfacing a flexible circuitry device with an apparatus includes a housing having a lower housing portion and an upper housing portion with a button region for a button, circuit board(s) including contact(s) for interfacing with corresponding contact(s) of an I/O section of flexible circuitry, retention feature(s) for frictionally retaining the I/O section against the contact(s) of the circuit board(s), and a cable interface. When the button is in a retain position, the button creates a downward force on the retention feature(s) toward the lower housing portion, thereby frictionally retaining the I/O section of the flexible circuitry, and, when the button is in a release position, the retention feature(s) is displaced in a direction of the upper housing portion, thereby creating or widening an aperture for insertion of the I/O section.

24 Claims, 13 Drawing Sheets

(51) Int. Cl.
*H01R 12/70* (2011.01)
*H01R 12/85* (2011.01)
*H01R 13/73* (2006.01)

(52) U.S. Cl.
CPC ..... *H01R 12/7076* (2013.01); *H01R 12/7088* (2013.01); *H01R 12/85* (2013.01); *H01R 13/73* (2013.01); *H01R 2201/12* (2013.01)

(58) Field of Classification Search
CPC .... H01R 12/7088; H01R 12/85; H01R 12/88; H01R 12/77; H01R 13/73; H01R 4/28; H01R 4/52; A61B 5/6838; A61B 5/25; A61B 5/273; A61B 5/274; A61B 5/254; Y10S 439/909
USPC .......................................................... 439/131
See application file for complete search history.

(56) References Cited

U.S. PATENT DOCUMENTS

| | | | | |
|---|---|---|---|---|
| 5,201,661 | A | 4/1993 | Ii | |
| 5,474,468 | A | 12/1995 | Chishima et al. | |
| 5,498,235 | A * | 3/1996 | Flower | A61N 1/303 604/20 |
| 5,525,072 | A | 6/1996 | Kunishi | |
| 5,632,646 | A | 5/1997 | Ii et al. | |
| 6,000,951 | A | 12/1999 | Hansen et al. | |
| 6,059,601 | A | 5/2000 | Hirai et al. | |
| 6,162,083 | A | 12/2000 | Seto | |
| 6,272,936 | B1 | 8/2001 | Oreper et al. | |
| 6,541,756 | B2 * | 4/2003 | Schulz | H01R 13/6275 250/221 |
| 7,371,093 | B1 | 5/2008 | Johnson | |
| 8,029,303 | B2 * | 10/2011 | Chiang | H01R 13/60 439/518 |
| 9,460,757 | B2 | 10/2016 | Rothenberg et al. | |
| 9,843,127 | B2 * | 12/2017 | Liu | H04R 1/1041 |
| 10,630,012 | B2 * | 4/2020 | Zhao | H01R 13/506 |
| 2006/0019528 | A1 | 1/2006 | Kuan | |
| 2009/0233462 | A1 | 9/2009 | Cheng | |
| 2010/0321878 | A1 * | 12/2010 | Huang | G06K 19/07732 439/131 |
| 2013/0072870 | A1 * | 3/2013 | Heppe | A61M 1/3653 604/6.16 |

* cited by examiner

CONNECTOR FOR FLEXIBLE CIRCUITRY ELECTRICAL INTERFACE

CROSS-REFERENCE TO RELATED APPLICATIONS

This application claims priority to U.S. Provisional Patent Application Ser. No. 63/409,453, entitled "Connector for Flexible Circuitry Electrical Interface," filed Sep. 23, 2022. All above identified applications are hereby incorporated by reference in their entireties.

BACKGROUND

Wearable technology is becoming more and more a part of everyday life. Wearable technology can help us monitor health related signals from our bodies as well as to intervene if necessary. For example, a heart rate or a heart rate variability monitoring wearable sensor can detect a potential health problem and trigger a response. This response can range from contacting first responders or others via an interaction with a cellular phone or directly via a dedicated device accessing the cellular or other networks. A response can also be in the form of directly responding to a potential health problem, for example, the production of a defibrillation pulse from a device to which the sensor(s) is/are connected. The response could also be in the form of a low intensity pulse to modulate, for example, the nervous system of the wearer. In this latter example, as well as in the defibrillation example, the electrodes through which the response is carried out may also be based on a wearable technology. In all these examples, the electrodes as well as the sensors need to be connected to some signal processing and/or delivering circuitry. One of the points of this electrode circuit most prone to failure is the connection point. In order to prevent this, the connectors are generally built very robustly, thus making the connection relatively expensive.

SUMMARY OF ILLUSTRATIVE EMBODIMENTS

The inventors recognized a need for creating a direct connection between flexible circuitry and another apparatus that does not require stiffening of any portion of the flexible circuitry and does not require keying of the flexible circuitry for unidirectional acceptance into the corresponding connector. To manufacture the least expensive circuit, being able to utilize a single sided circuit for a wearable sensor/electrode which can be connected in any orientation without the need of a connector on it would be the most advantageous. Furthermore, since wearable technology is exposed to everyday events, it would be even more advantageous if the connection between the wearable sensor/electrode to signal processing and/or delivering circuitry is made such that is water and dust proof/resistant. In addition, a wearable sensor/electrode needs to make a reliable and secure connection; however, it is beneficial to enable disconnection without damage if it is accidentally (or purposely) pulled forcefully, such as when part of the sensor/electrode is caught in a handle or doorknob as the user passes by.

Accordingly, the present inventors devised of a novel connector to seat and retain a flexible I/O portion of a flexible circuitry device to another apparatus. The flexible circuitry device may be a wearable medical device for flexible positioning on a surface of the skin of a patient. The wearable medical device, in some examples, may include one or more sensors for obtaining biometric data regarding the patient and/or one or more therapeutic elements. In an illustrative embodiment, the flexible circuitry may be a non-invasive electrostimulation device for stimulating one or more nerve systems of the patient. The apparatus may be a controller of the flexible circuitry device, a data collection device (e.g., storage medium, portable computing device, etc.) and/or another medical therapy and/or physiological monitoring device (e.g., a wearable patient monitoring device such as a Holter monitor, a fitness monitoring device, etc.).

In one aspect, the present disclosure relates to a connector to which a single sided flex-PCB and/or a flexible printed electronics circuit can be connected in either orientation without the need of any additional component on the single-sided flex-PCB and/or flexible printed electronic circuit; in other words, without the need to add a keyed connector or stiffener to the wearable sensor/electrode. In some embodiments, connectors described herein produce a water and dust resistant connection regardless of how thin the substrate onto which the sensor/electrode is printed or produced. Furthermore, in certain embodiments, the connectors described herein produce a robust and reliable connection by producing a frictional force which is adequate to hold a reliable connection while at the same time allowing the sensor/electrode connection to be released in the event of a sufficiently strong force (e.g., tugging, pulling) opposing the connection. The connector, for example, may include a spring-loaded mechanism which allows for the friction tierce to be removed when inserting the sensor/electrode, thereby achieving what is called in the industry a zero insertion force (ZIF) connection.

In one aspect, the present disclosure relates to flexible circuit connector designs incorporating a set of properties including (1) a ZIF, (2) a predetermined pull out force, (3) a reversible connection design use with single-sided circuits and/or flat cables, (4) a robust construction absent the addition of any extra component such as a stiffener on the connecting circuit or flat cable, and (5) a water and dust resistant connection. These properties may be combined in a single connector for wearable device applications.

The connector has a flexible or rigid-flex circuit board onto which the connection points are built. In some embodiments in which a flexible circuit board is used, stiffeners are added to rigidize and make the connection points mechanically stable. The circuit board may fold 180 degrees such that upper and lower contact positions are provided. These upper and, lower contact positions make a reversible connection possible. That is, a single-sided flat printed circuit can be inserted with its printed or plated contacts facing either up or down.

In some embodiments, the electrical signals originate or are processed on the connector's circuit board. In other embodiments, the electrical signals are processed and/or originate on a separate circuit. In the latter, a cable interface connector) may be added to the connector circuit board such that a wire cable can be used to further carry the signal to/from the second circuit. In other embodiments, wireless capabilities (e.g., BLE, or ZigBee) may be added on the connector circuit such that signals can be wirelessly transmitted to/from the second circuit.

In some embodiments, leaf spring electrical contacts are used at the connection points on the connector. The connector, for example, may include a spring-loaded mechanism that exerts a frictional force on the substrate onto which the contact points (e.g., contact pads) of a sensor or multisensory and/or stimulating electrode or electrodes are printed or plated. The frictional force, for example, may be determined using the spring constant, the location of the spring in relation to the contact points, the length of the spring, and the spring initial compression. In some implementations, a button is provided to release the friction force, therefore achieving a ZIF when connecting the sensor(s)/electrode(s). The button, in some examples, may be depressed or pushed forward to achieve the friction force by a wedging action resulting in a downward force.

In other embodiments, raised conductive surfaces (e.g., square, semi-circular, etc.) are used to make electrical contact. In further embodiments, a combination of leaf springs and raised conductive surfaces are used.

In some embodiments, the connector includes a molded impermeable membrane to prevent water from contacting the circuit or its components. The membrane, for example, may conform around the inserted sensor(s)/electrode(s) contact points to prevent water from entering at the connection point. The membrane may be lifted when the spring-loaded force is released such that the sensor(s)/electrode(s) are inserted, achieving a zero force.

In some embodiments, the connector includes a self-centering feature such that upon insertion, the sensor/electrode contact points are self-centered and aligned with the contact points on the connector circuit board.

In some embodiments, the connector includes or is fixed to a clip, thereby allowing the wearer to clip the connector to her/his garments.

The foregoing general description of the illustrative implementations and the following detailed description thereof are merely exemplary aspects of the teachings of this disclosure and are not restrictive.

BRIEF DESCRIPTION OF THE DRAWINGS

The accompanying drawings, which are incorporated in and constitute a part of the specification, illustrate one or more embodiments and, together with the description, explain these embodiments. The accompanying drawings have not necessarily been drawn to scale. Any values dimensions illustrated in the accompanying graphs and figures are for illustration purposes only and may or may not represent actual or preferred values or dimensions. Where applicable, some or all features may not be illustrated to assist in the description of underlying features. In the drawings.

DETAILED DESCRIPTION OF ILLUSTRATIVE EMBODIMENTS

Figure 1A:
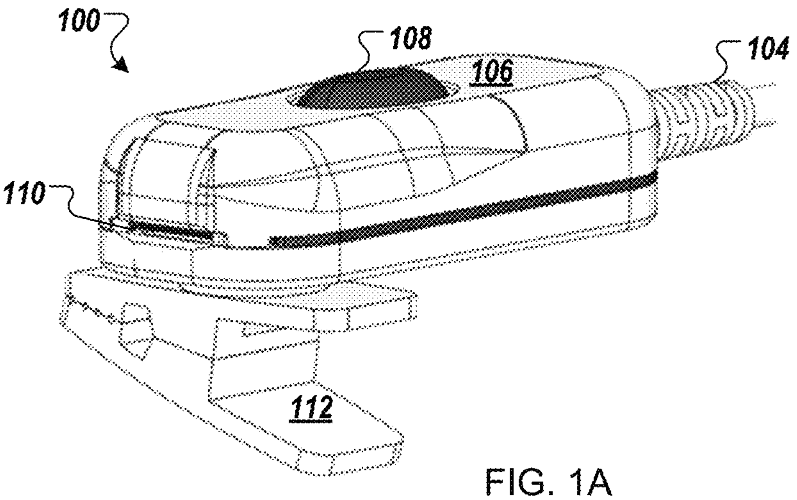
FIG. 1A and FIG. 1B illustrate a first example connector for interfacing flexible circuitry with another apparatus.

The description set forth below in connection with the appended drawings is intended to be a description of various, illustrative embodiments of the disclosed subject matter. Specific features and functionalities are described in connection with each illustrative embodiment; however, it will be apparent to those skilled in the art that the disclosed embodiments may be practiced without each of those specific features and functionalities.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments. Further, it is intended that embodiments of the disclosed subject matter cover modifications and variations thereof.

It must be noted that, as used in the specification and the appended claims, the singular forms "a," "an," and "the" include plural referents unless the context expressly dictates otherwise. That is, unless expressly specified otherwise, as used herein the words "a," "an," "the," and the like carry the meaning of "one or more." Additionally, it is to be understood that terms such as "left," "right," "top," "bottom," "front," "rear," "side," "height," "length," "width," "upper," "lower," "interior," "exterior," "inner," "outer," and the like that may be used herein merely describe points of reference and do not necessarily limit embodiments of the present disclosure to any particular orientation or configuration. Furthermore, terms such as "first," "second," "third," etc., merely identify one of a number of portions, components, steps, operations, functions, and/or points of reference as disclosed herein, and likewise do not necessarily limit embodiments of the present disclosure to any particular configuration or orientation.

Furthermore, the terms "approximately," "about," "proximate," "minor variation," and similar terms generally refer to ranges that include the identified value within a margin of 20%, 10% or preferably 5% in certain embodiments, and any values therebetween.

All of the functionalities described in connection with one embodiment are intended to be applicable to the additional embodiments described below except where expressly stated or where the feature or function is incompatible with the additional embodiments. For example, where a given feature or function is expressly described in connection with one embodiment but not expressly mentioned in connection with an alternative embodiment, it should be understood that the inventors intend that that feature or function may be deployed, utilized or implemented in connection with the alternative embodiment unless the feature or function is incompatible with the alternative embodiment.

A wearable sensor/electrode should be comfortable to wear and thus is preferably light and flexible; one way to achieve this is by producing the sensor/electrode on a flexible substrate such as it is done in polyimide based flexible printed circuit boards (flex-PCB) technologies or by utilizing printed electronics techniques which uses conductive inks on polyethylene terephthalate (PET) based materials as well as on certain fabrics. In many cases, the components that are placed onto the circuit are the costliest aspect of the electronic ensemble, and the assembly process (manual or automated solder reflow) itself is also generally expensive. Furthermore, special considerations and precautions are frequently taken when the component being assembled is the connector; in particular, in a wearable device since the connection point is generally one of the points in which larger forces and torques are produced. Typically, these areas are reinforced with additional solder points. However, this method is not sufficient alone for flexible circuit applications. In order to reduce cost and strengthen the connection, the industry has developed what are known as stiffeners which are added at the connection point of flex-PCBs or printed electronics to help make a stable connection. The stiffeners are used to rigidize a part of a circuit in order to make it mechanically stable. The portion of the sensor/electrode circuit with the stiffener is then used to connect the sensor/electrode circuit to a second circuit which can process the sensor signals or send signals/pulses to the electrode. The stiffener is usually inserted into a special connector on the second circuit.

Even though the stiffener may not be considered by some as a connector component, the fact is that it is a component that is added to the circuit. This requires an extra step in the assembly in addition to producing the conductive traces and patches that make the sensor/electrode circuit. Adding a stiffener not only takes a second step to accomplish but it also adds thickness to a small portion of the circuit which can make stacking and/or rolling the circuits cumbersome or even not possible.

To achieve mass adoption for wearable technologies, the cost to produce these technologies needs to be as low as possible. One way to maintain the cost of wearable sensors and/or electrodes is to limit the circuit to a single sided print. However, one issue with keeping wearable sensors/electrodes to a single sided print is that when connecting these sensors/electrodes the connection can only be made in a single orientation, i.e., the connection is not reversible. This design hampers user experience and limits usability. To overcome this problem, product designers use connectors with an added feature, or features, that make the interconnection only possible by aligning the connectors in a particular orientation (i.e., keyed connectors). As stated earlier, adding a connector increases the cost of the wearable, and adding a keyed connector can potentially increase it even more.

Figure 1B:
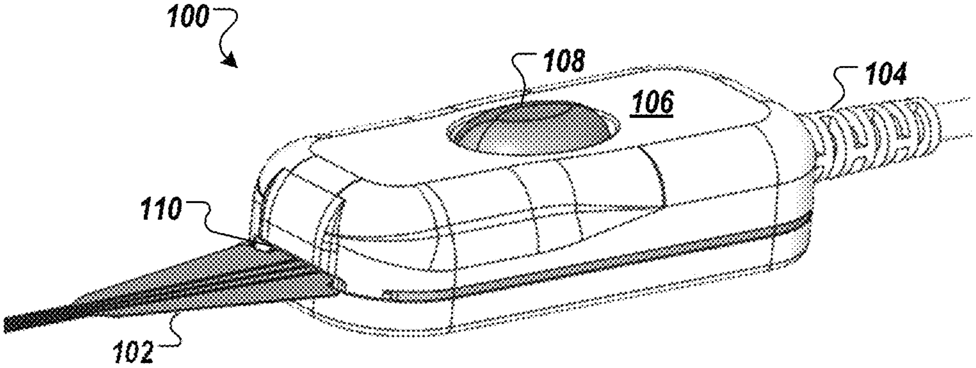

FIG. 1A and FIG. 1B illustrate a first example connector 100 for interfacing a flexible circuitry connection portion 102 of a flexible circuitry element with another apparatus connected to an electrical (e.g., power and/or data) cord 104. The electrical cord 104 (e.g., cable), for example, may transfer power to the flexible circuitry connection portion 102, provide control signals to the flexible circuitry connection portion 102, and/or obtain signals from the flexible circuitry connection portion 102. In an illustrative example, the connector 100 may be used to connect a control unit to a medical device designed with flexible printed circuitry.

To avoid tugging on the flexible circuitry connection portion 102, in some embodiments a clip 112 or other retention device (e.g., pin, magnet pair, hook and loop material, elastic strap, etc.) is releasably connected to or affixed to a connector housing 106 to maintain position of the connector housing 106 in relation to a wearer of a wearable medical device. The type and design of the retention device, for example, may depend on the use of the flexible circuitry element including the flexible circuitry connection portion 102. In an illustrative example, a flexible circuitry medical device to be worn on a region of a head or neck of the patient may include an alligator clip type retention device 112, as illustrated, to fasten the connector 100 to an article of clothing such as a shirt collar or pocket, for example.

In some implementations, the connector housing 106 includes or encases a button 108 for lifting an internal retention apparatus and accepting insertion of the flexible circuitry connection portion 102. For example, in use, an operator may press the button 108, insert an end of the flexible circuitry connection portion 102 into a port 110 of the connector housing 106, and release the button 108 such that the flexible circuitry connection portion 102 is frictionally retained in the connector housing 106.

Figure 2A:
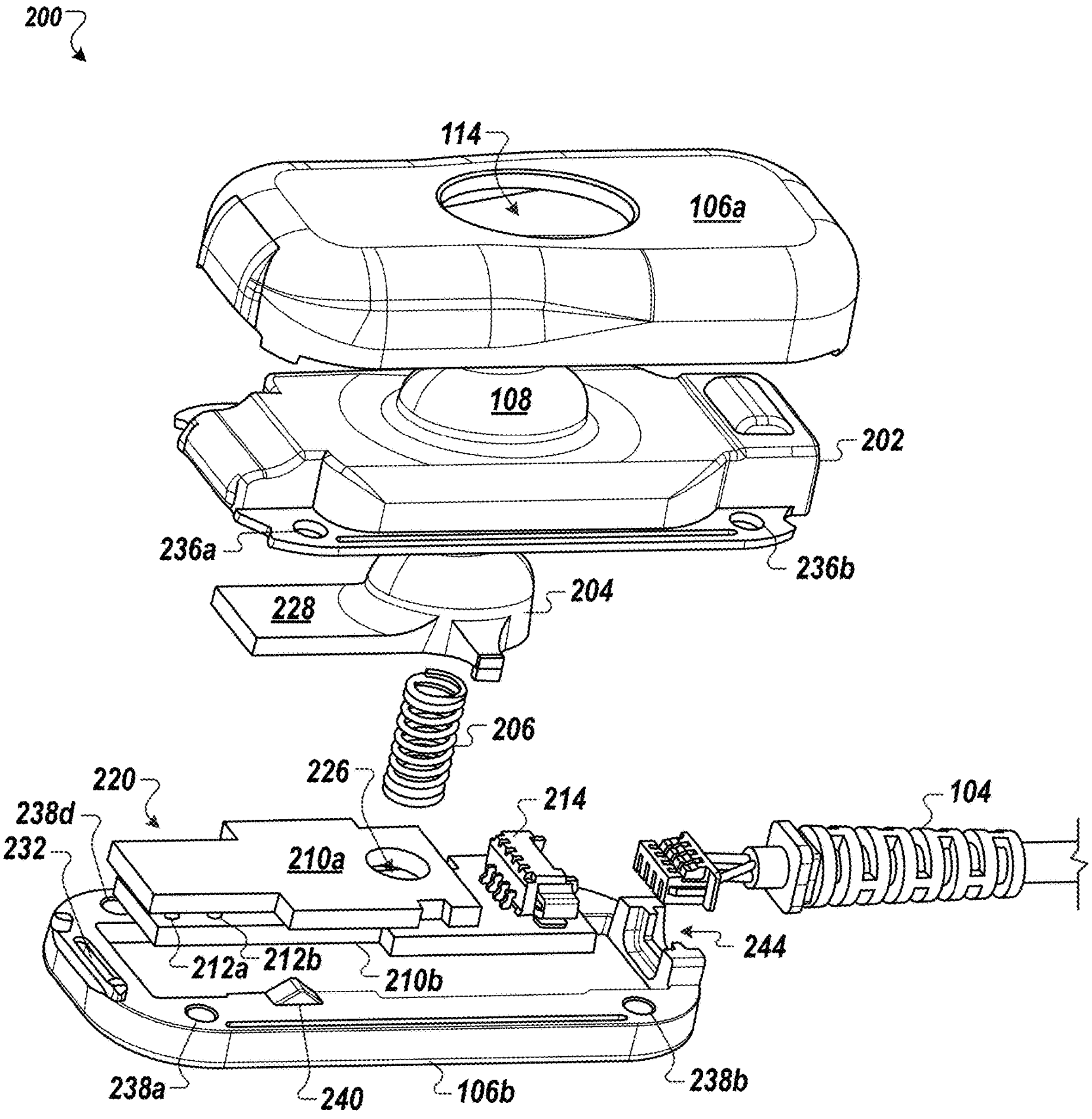
FIG. 2A through FIG. 2E illustrate example internal components of the first connector of FIG. 1A and FIG. 1B.

FIG. 2A illustrates an exploded view 200 of the connector 100 of FIG. 1A and FIG. 1B including example internal mechanisms of the connector 100 enclosed within connector housing 106. As illustrated, the connector housing 106 is separated into an upper housing portion **106*a* having a recess for receiving internal components of the connector 100 and a lower housing portion 106*b* having a recess for receiving internal components of the connector 100 such that the housing 106 encapsulates the inner components of the connector 100 within the mated halves 106*a*, 106*b* of the housing 106. The upper housing portion 106*a* includes a button aperture 114. The button 108 visible in FIG. 1A and FIG. 1B, as illustrated, is part of a flexible membrane 202 covering a base of the button mechanism 204 actuated with a spring 206. The flexible membrane 202 is further configured to cover a retention unit 220 including an upper retention plate 210*a* and a lower retention plate 210*b*. The flexible circuitry connection portion 102 of FIG. 1B, for example, may be retained between the upper retention plate 210*a* and the lower retention plate 210*b*, with a set of electric contacts 212*a*, 212*b* disposed to establish electrical contact with surface contacts of the flexible circuitry connection portion 102**.

Figure 2B:
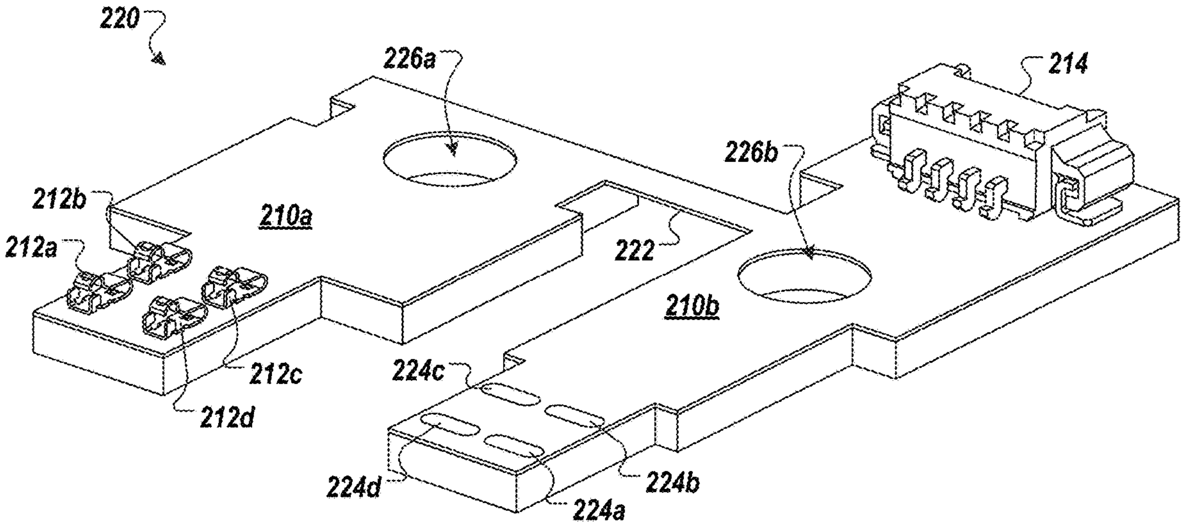

Turning to FIG. 2B, a schematic diagram of the retention unit 220 illustrates that the upper retention plate **210*a* is connected to the lower retention plate 210*b* via a connection bridge 222, carrying electrical connection (e.g., power, stimulation signals, and/or data) between the set of electric contacts 212*a* through 212*d* to a data interface (e.g., socket, cable connector, etc.) 214. As illustrated, the set of electric contacts 212*a* through 212*d* are electromechanical leaf springs configured to frictionally retain flexible circuitry inserted between the upper retention plate 210*a* and the lower retention plate 210*b*. For providing the advantage of reversible connection with the inserted flexible circuitry whether the contact pads on the flexible circuitry are directed toward the upper retention plate 210*a* or the lower retention plate 210*b*, in some embodiments, the lower retention plate 210*b* includes electric contact pads 224*a-d*, also electrically connected with the data interface 214**.

In some embodiments, the upper retention plate **210*a*, the lower retention plate 210*b*, and the connection bridge 222 of the retention unit 220 is formed of a printed flexible circuit board with a stiffener layer added to increase rigidity and mechanical support. The stiffener layer, for example, may be provided on surfaces of the upper retention plate 210***a* and the lower retention plate 210*b* having the contacts 212, 224. In one example, the flexible circuit may be formed using a polyimide substrate, and the stiffener layer may be a glued FR-4 (flame-retardant glass epoxy) backer. In some embodiments, the upper retention plate 210*a* and the lower retention plate 210*b* are formed of a rigid flex material.

Figure 2C:
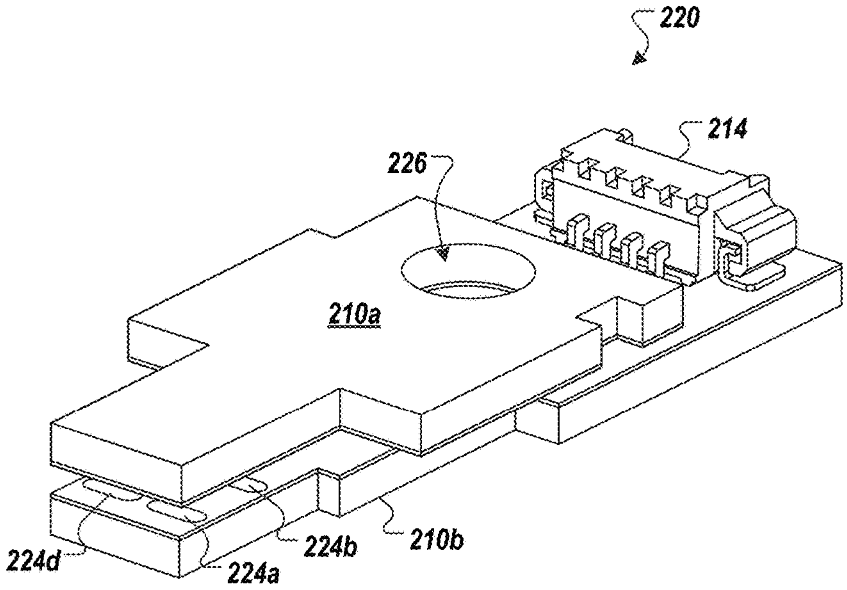

Turning to FIG. 2C, a folded view of the retention unit 220 illustrates that the connection bridge 222 is configured to fold such that the upper retention plate 210*a* flips onto the top of the lower retention plate 210*b*, thereby aligning the set of electric contacts 212*a-d* with the set of electric contact pads 224*a-d*. When aligned, in some embodiments, an upper spring aperture 226*a* of the upper retention plate 210*a* aligns with a lower spring aperture 226*b* of the lower retention plate 210*b*.

Figure 3A:
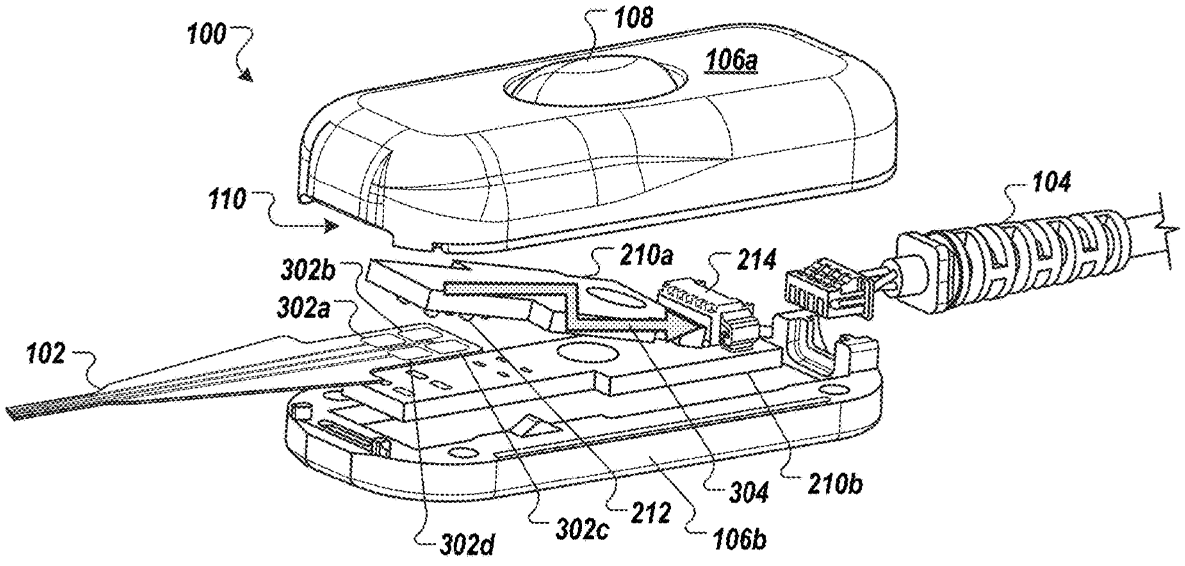
FIG. 3A and FIG. 3B illustrate example electrical and/or data paths for enabling communication between a flexible circuitry component and a wired component interconnected using a connector as described in embodiments herein.
Figure 3B:
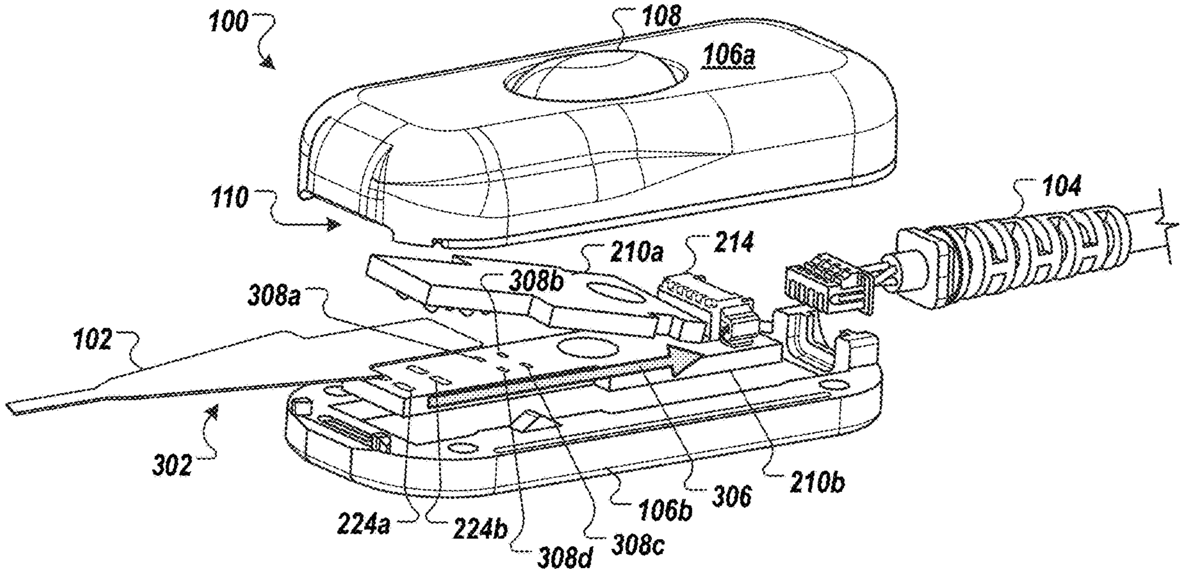
Figure 4:
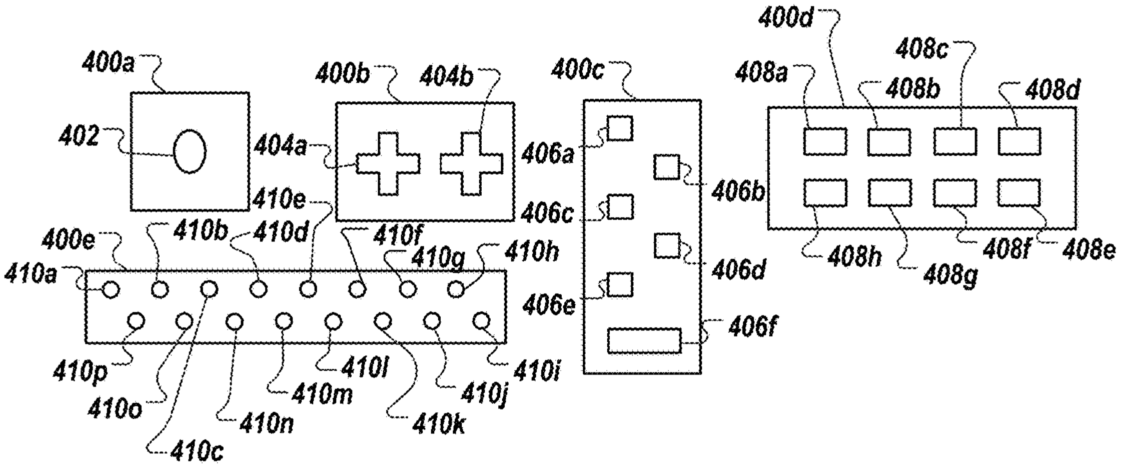
FIG. 4 illustrates example contact pad configurations for flexible circuitry configured to interoperate with a connector as described in embodiments herein.

Turning to FIG. 3A and FIG. 3B, schematic diagrams of the connector 100 interfacing with the flexible circuitry connection portion 102 demonstrate electrical paths for providing power and data to the flexible circuitry depending upon an orientation of the flexible circuitry connection portion 102 when inserted between the retention plates 210*a*, 210*b*. As illustrated, in a first example of FIG. 3A where a set of contact pads 302*a-d* of the flexible circuitry connection portion 102 are oriented in a direction toward the upper retention plate 210*a*, a corresponding electrical path 304 between the contact pads 302 and the data interface 214 follows a circuit extending between the electric contacts 212 of the upper retention plate 210*a*, around the connector bridge 222 of FIG. 2B to the lower retention plate 210*b* and from there to I/O pins of the data interface 214. The contact pads 302, as illustrated, are rounded rectangles in design configured to produce an electrical connection with smaller rectangles or rounded rectangles of the contacts 224 of the lower retention plate 210*b* and/or the leaf spring contacts 212 of the upper retention plate 210*a*. In other embodiments, the contact pads 302 may be configured as different shapes such as, in some examples, squares, circles, ovals, and/or semicircles. Similarly, the contacts 224 may be configured using different shapes such as, in some examples, squares, circles, ovals, and/or semicircles. Additionally, although illustrated using an example pattern of contact pads 302 and electrical contacts 212 laid out in a roughly square design, in other embodiments, the contact pads 302, contacts 224, and leaf spring contacts 212 may be laid out in a staggered or more random pattern. Turning to FIG. 4, for example, a set of example contact patterns 400*a* to 400*e* are illustrated, presenting a small sample of the potential contact pad shapes and patterns that may be used with the connectors of the present disclosure. Contact pad pattern 400*a* includes a single oval-shaped contact 402. Pattern 400*b* includes two plus-shaped contacts 404*a* and 404*b*. Contact pad pattern 400*c* includes a staggered pattern of square contacts 406*a* through 406*e* as well as a rectangular contact 406*f*. Contact pad pattern 400*d* includes pairs of parallel rectangular contacts 408*a* through 408*h*. Finally, contact pad pattern 400*e* includes a staggered pattern of circular contacts 410*a* through 410*p*. As illustrated, many different shapes and layouts of contact pads are possible.

In a second example of FIG. 3B where the set of contact pads 302 of the flexible circuitry connection portion 102 are oriented in a direction toward the lower retention plate 210*b*, a corresponding electrical path 306 between the contact pads 302 and the data interface 214 follows a circuit extending between the electric contact pads 224 of the lower retention plate 210*b* to the I/O pins of the data interface 214.

Returning to FIG. 2A, in some implementations, the button actuation mechanism of the connector 100 includes the base of the button 204, the spring 206, and the upper retention plate 210*a*. The spring 206 extends from an upper surface of the lower housing portion 106*b*, through the spring aperture 226 in the retention unit 220, and into a base of the button 204. For example, the upper surface of the lower housing portion 106*b* may include a spring retention feature such as a clip for positioning the spring 206, and the base of the button 204 may include a receiving aperture 230 (illustrated in FIG. 2D) for receiving the other end of the spring 206.

In some implementations, an extension 228 portion of the base of the button 204 is configured to apply a retaining force against the upper retention plate 210*a* when the spring 206 is in an extended state (e.g., the base of the button 204 is not depressed). The retaining force, for example, may cause the contacts 212 of the upper retention plate 210*a* (e.g., electromechanical spring leaf contacts) to exert frictional force against the flexible circuitry connection portion 102 when inserted between the retention plates 210*a*, 210*b*.

In some implementations, when a user exerts a downward force on the base of the button 204, the spring 206 compresses and the base of the button 204 transfers force to the upper retention plate 210*a* in a region opposite the contacts 212, rocking the upper retention plate 210*a* along a fulcrum 240 of the lower housing portion 106*b* and thereby causing the upper retention plate 210*a* to act as a lever to separate the contacts 212 from the lower retention plate 210*b* and/or the flexible circuitry connection portion 102 when retained between.

In some implementations, the connector 100 includes the flexible membrane 202 for providing water resistance and/or dust ingress to the interior of the connector 100. The flexible membrane 202, in some examples, may be designed from rubber or silicone. The flexible membrane 202, for example, may provide a path for liquid to traverse over the top of the membrane 202 (e.g., entering via the button aperture 114 of the upper housing portion 106*a*) and around an interior of the housing 106. The lower housing portion 106*b*, for example, may include an aperture (e.g., slot) 232 to prevent any introduced moisture from pooling within the housing 106.

Figure 2D:
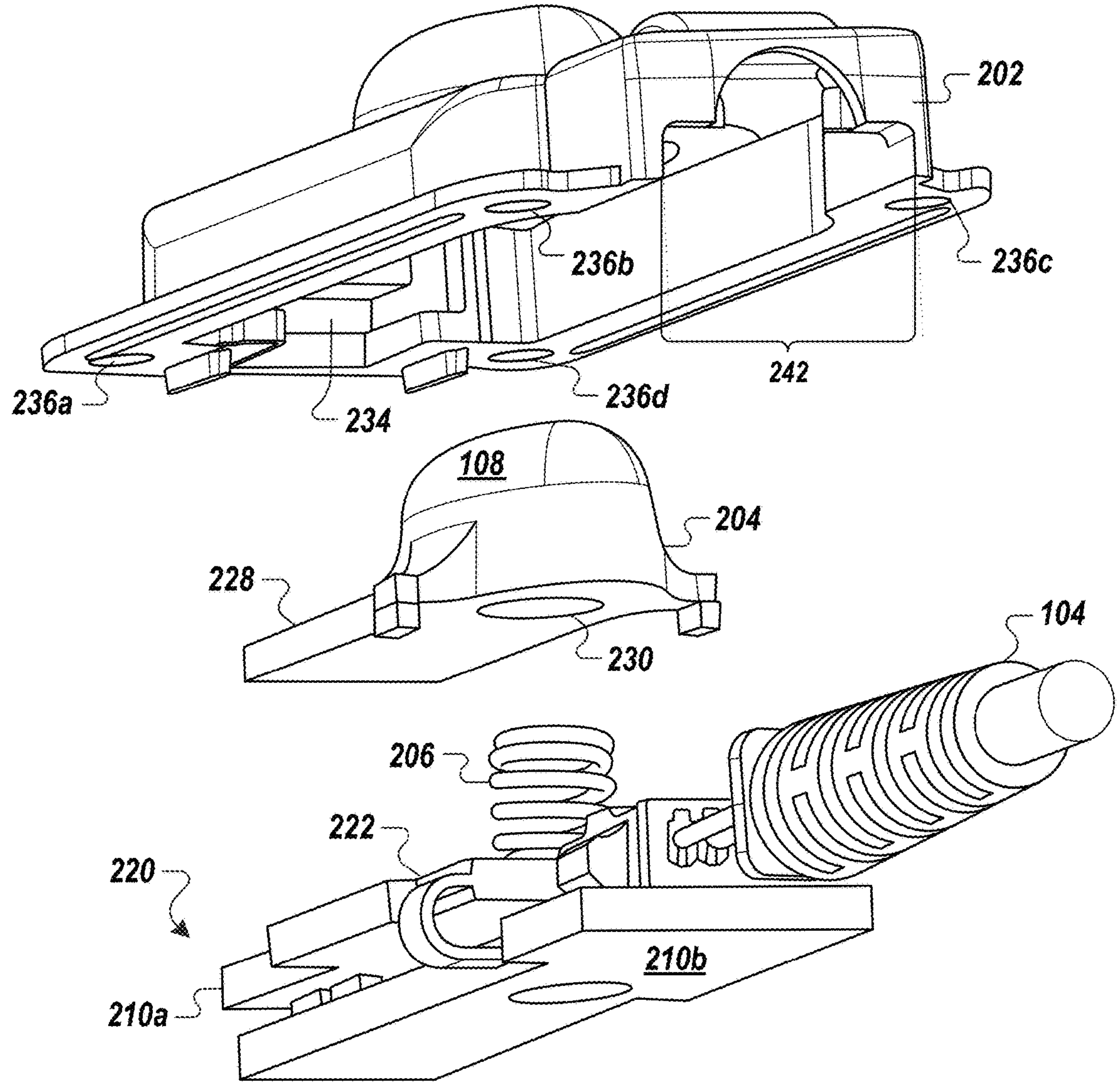
Figure 2E:
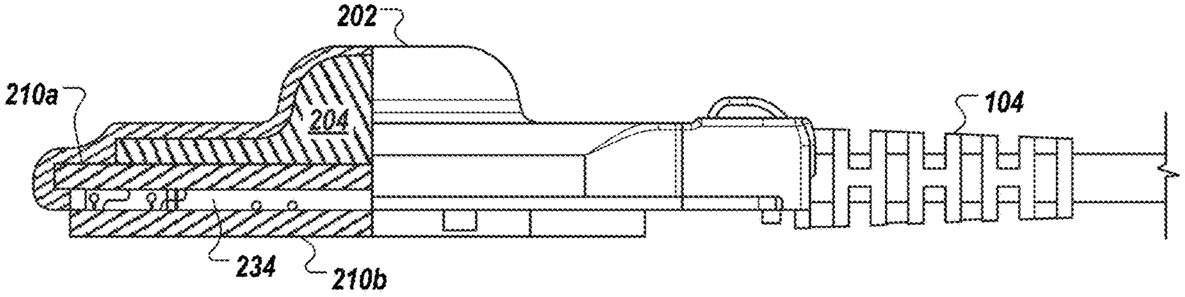

An interior of the flexible membrane 202, in some embodiments, includes one or more engagement features for receiving the upper retention plate 210*a*, for example, an engagement groove 234 as illustrated in FIG. 2D. The engagement groove 234 is further visible in a sectional view of FIG. 2E.

As illustrated in FIG. 2A and FIG. 2D, the flexible membrane 202, in some embodiments, includes connector apertures 236*a-d* for receiving screws. Flanges around the connector apertures 236 may function as washers for waterproofing/water resistance. The screws, for example, may releasably fix the flexible membrane 202 to the lower housing portion 106*b* via apertures 238 in the lower housing portion 106*b*.

Turning to FIG. 2D, in some implementations, the flexible membrane 202 includes a cut-out feature 242 configured to surround the wire strain relief end of the electrical cord 104. The cut-out feature 242 includes a half-moon cut-out matching a half-moon shape 244 (see, e.g., FIG. 2A) of the lower housing portion 106*b*. The design of the surround, for example, may provide a waterproofing/water resistant effect to the electrical cord interface.

Figure 5:
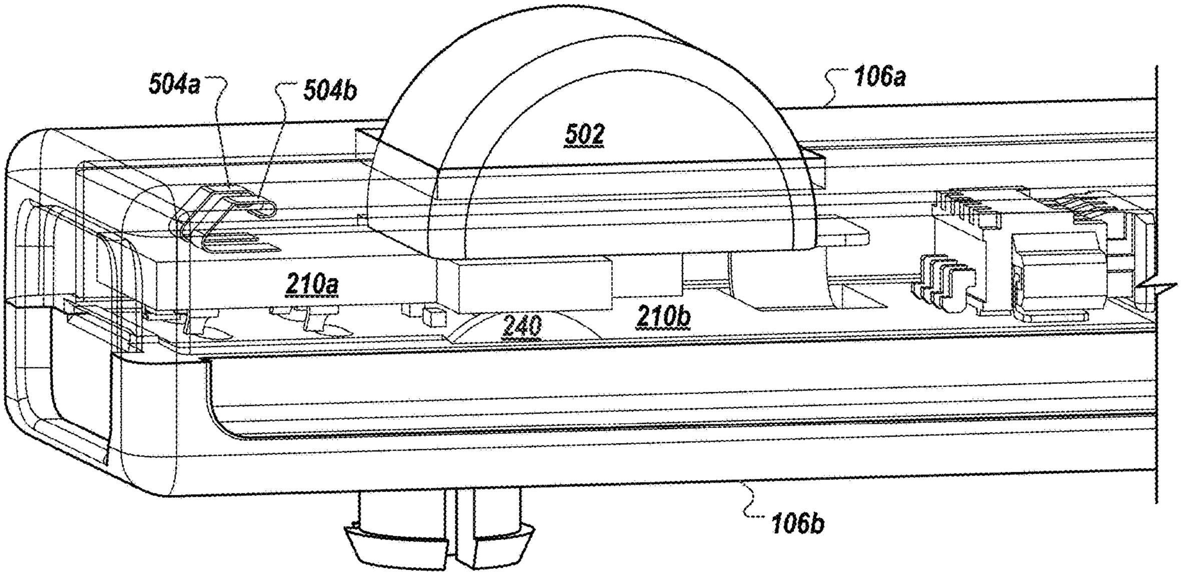
FIG. 5 illustrates another embodiment of example internal components for the first example connector of FIG. 1A and FIG. 1B.

FIG. 5 illustrates another embodiment of example internal components for the first example connector of FIG. 1A and FIG. 1B. As illustrated in FIG. 5, the extension 228 is missing from a base of the button 204. Instead, a set of spring elements (e.g., leaf springs) 504*a*, 504*b* are disposed in a similar location and configured to exert a retention force on the upper retention plate 210*a*, thereby urging the upper retention plate 210*a* toward the lower retention plate 210*b*. Although illustrated as two spring elements 504*a*, 504*b*, in other embodiments, only a single spring element may be used, or three or more spring elements may be configured to exert a retention force on the upper retention plate 210*a* to retain the flexible circuitry. To insert flexible circuitry and/or release flexible circuitry after insertion, a button 502 may be depressed, causing the upper retention plate 210*a* to rock back against the fulcrum 240 and urging the spring elements 504*a*, 504*b* upward toward the upper housing portion 106*a*.

Figure 6A:
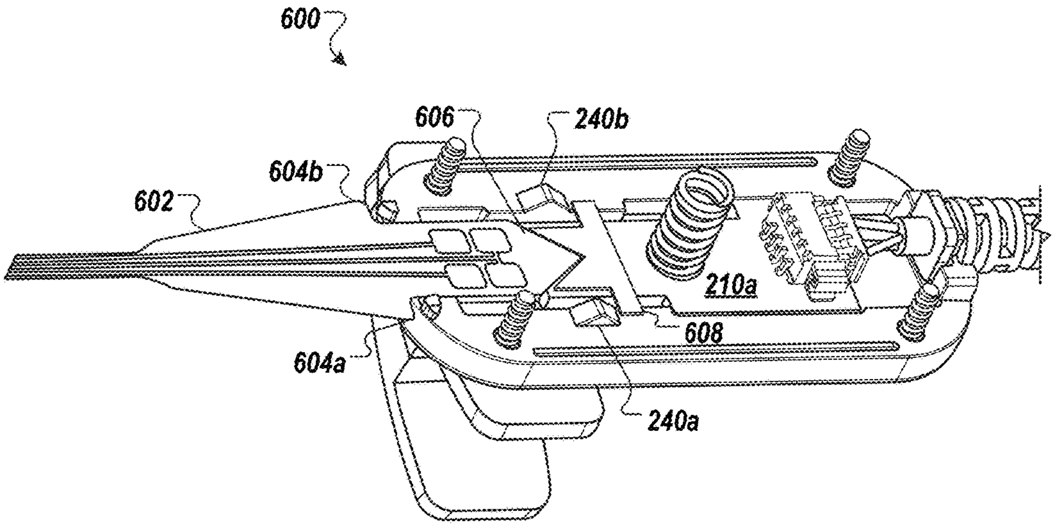
FIG. 6A and FIG. 6B illustrate example flexible circuitry connection portion designs for aligning the position of contact pads on the flexible circuitry connection portion between retention plates of a connector as described in embodiments herein.
Figure 6B:
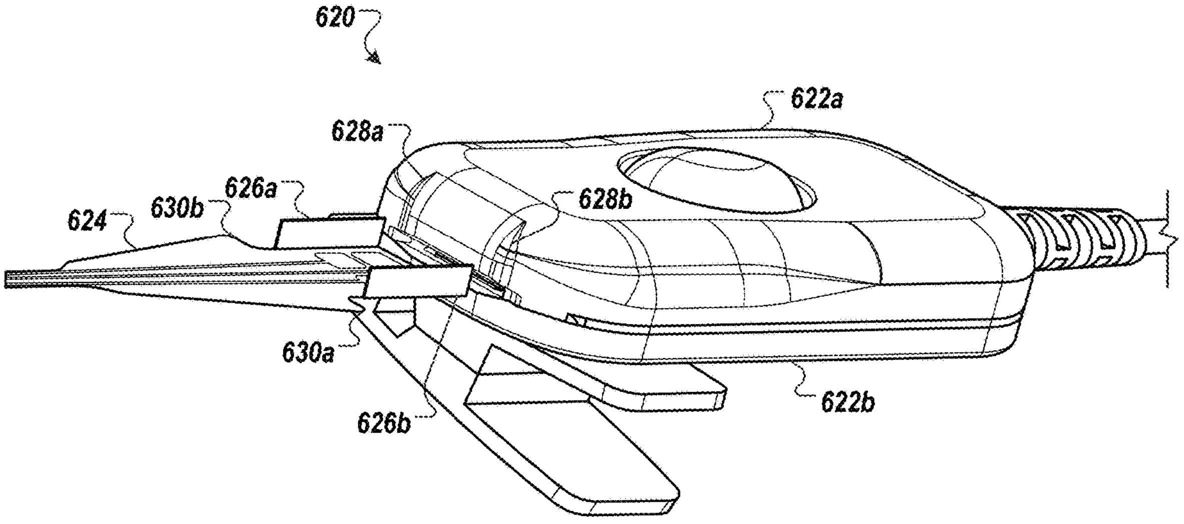

FIG. 6A and FIG. 6B illustrate example flexible circuitry connector designs for aligning the position of flexible circuitry contact pads between retention plates of a connector as described in embodiments herein. Turning to FIG. 6A, in a first example design, a flexible circuitry connection portion 602 includes a shaped insertion end 606 configured to mate with a mating element 608 disposed on an upper side of the lower retention plate 210*a* to consistently align the contact pads of the flexible circuitry connection portion 602 between the retention plates 210 in a connector 600. For example, as illustrated, the flexible circuitry connection portion 602 includes a pointed, triangular-shaped end 606 designed to fit against a triangular-cut-out of the mating element 608. In other embodiments, the shaped end 606 and corresponding mating element 608 may be designed with different shapes, such as, in some examples, a rounded end, a squared end, or a reverse triangle (e.g., with the mating element 608 having a pointed end configured to mate with an indent of the flexible circuitry connection portion 602). Further, to control a depth of insertion, the flexible circuitry connection portion 602 may include shoulders 604*a*, 604*b* configured to be wider than an opening in the housing of the connector 600. Although illustrated as tapering from the shoulders 604*a*, 604*b*, in other embodiments, the flexible circuitry connection portion 602 maintain the width in interfacing with the connected flexible circuitry element (e.g., medical device, physiological monitoring sensor(s), etc.). For example, from the contact pad end of the flexible circuitry connection portion 602, rather than narrowing to a connection cable-type shape, the leads of the flexible circuitry may branch and split to interface with multiple physiological monitoring sensors.

Figure 9:
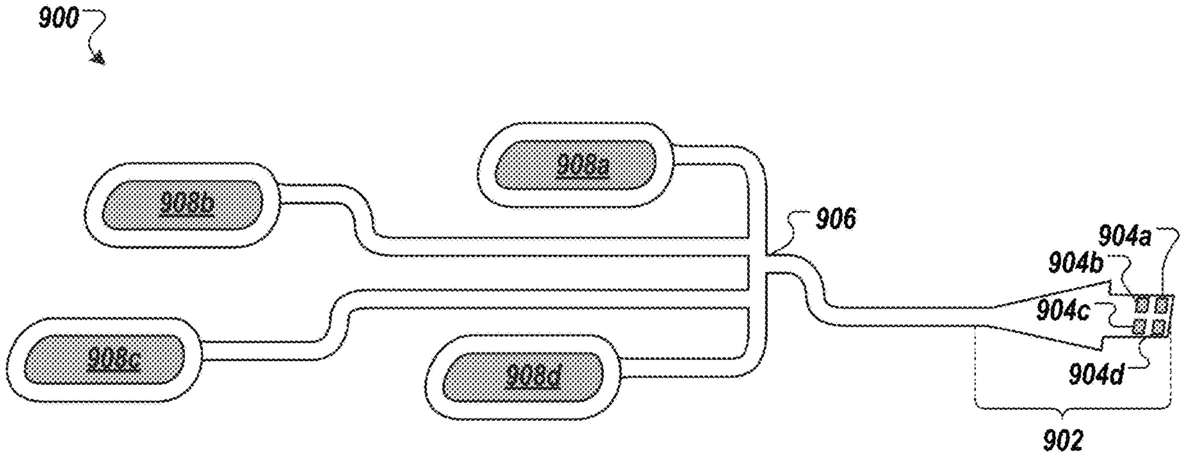
FIG. 9 illustrates an example flexible circuit device including a flexible circuit connection portion for interfacing a connector as described in embodiments herein.

For example, turning to FIG. 9, in some implementations, the flexible circuitry connection portion 602 is connected to a sensor device 900 including a set of electrodes 908*a-d*, branching from a flexible circuitry connection portion 902 having contact pads 904*a-d*. Instead of branching at point 906 of the sensor device 900, in other embodiments, the electrodes 908*a* through 908*d* may instead branch directly from a rectangular end of a flexible circuitry connection portion (not illustrated).

Turning to FIG. 6B, in a second example design, a flexible circuitry connection portion 624 includes a set of upward protrusions 626*a*, 626*b* (e.g., "wings") corresponding to a set of slots 628*a*, 628*b* in an upper housing portion 622*a* of a connector 620. The upward protrusions 626*a*, 626*b*, for example, may be angled upward from a planar surface of the flexible circuitry connection portion 624 (e.g., at approximately a 90 degree angle) by using a crimping operation on the flexible circuitry connection portion 624 to fold the protrusions 626*a*, 626*b* in the vertical direction. When inserting the flexible circuitry connection portion 624 into the connector 620, for example, the upward protrusions 626*a*, 626*b* may maintain centered alignment of the flexible circuitry connection portion 624 with the housing 622 of the connector 620. Similar to the flexible circuitry connection portion 602 of FIG. 6A, the flexible circuitry connection portion 624 may include a set of shoulders 630*a*, 630*b* to control an insertion depth of the flexible circuitry connection portion 624.

Figure 6C:
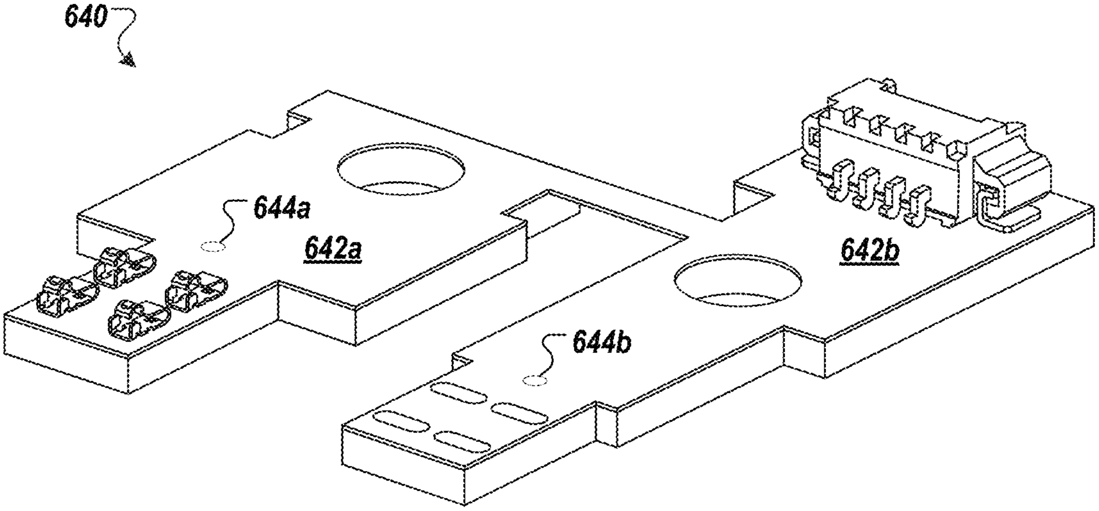
FIG. 6C and FIG. 6D illustrate example retention plate unit designs for ensuring proper alignment of flexible circuitry connection portions retained therebetween.

Turning to FIG. 6C, in some implementations, a flexible circuitry retention plate unit 640 includes, on each of an upper plate portion 642*a* and a lower plate portion 642*b*, a sensor element 644*a*, 644*b* of a proximity sensor. The sensor elements 644*a*, 644*b*, upon folding of the flexible circuitry retention plate unit 640, are configured to align. Upon insertion of the flexible circuitry connection portion 702 between the upper plate portion 642*a* and the lower plate portion 642*b*, for example, the flexible circuitry connection portion 702 will break the proximity sensor circuit between the sensor elements 644*a*, 644*b*, thereby causing a signal to be issued indicative of proper insertion of the flexible circuitry connection portion 702. Conversely, in other embodiments, the flexible circuitry connection portion 702 may include one of the sensor elements 644*a*, 644*b* (e.g., a single sensor element 644*b* may be disposed on the lower retention plate 642*b*) such that, upon insertion of the flexible circuitry connection portion 702, the proximity sensor circuit may be completed, thereby causing a signal to be issued indicative of proper insertion of the flexible circuitry connection portion 702.

Figure 6D:
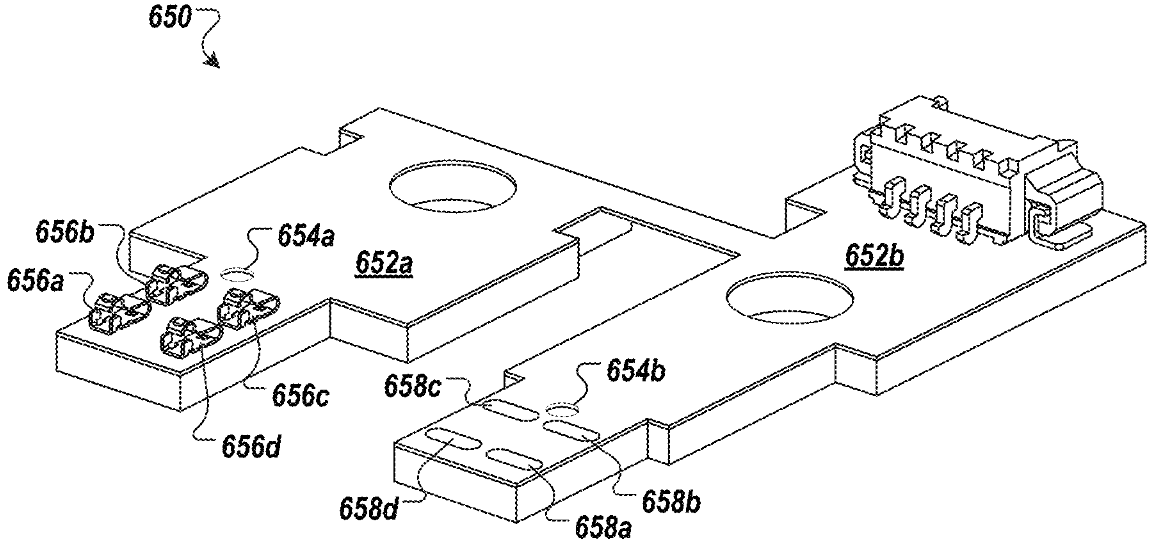

Turning to FIG. 6D, in some implementations, a flexible circuitry retention plate unit 650 includes, in each of an upper plate portion 642*a* and a lower plate portion 642*b*, an aperture 654*a*, 654*b*. The apertures 654*a*, 654*b*, upon folding of the flexible circuitry retention plate unit 650, are configured to align. Upon releasing the base of the button 204 of the connector 100 of FIG. 2A through FIG. 2E, a pin element may be released (e.g., from the extension 228 of the base of the button 204) to drop through the upper aperture 654*a*, an aperture in a flexible circuitry connection portion (not illustrated), and the lower aperture 654*b*, thereby locking the flexible circuitry connection portion in place. The locking pin, for example, may be used rather than or in addition to a set of leaf spring contacts 656*a-d*. For example, the leaf spring contacts 656*a-d* may be replaced, in some embodiments, with additional contact pads, such as a set of contact pads 658*a*-658*d* of the lower retention plate 652*b*.

Figure 7A:
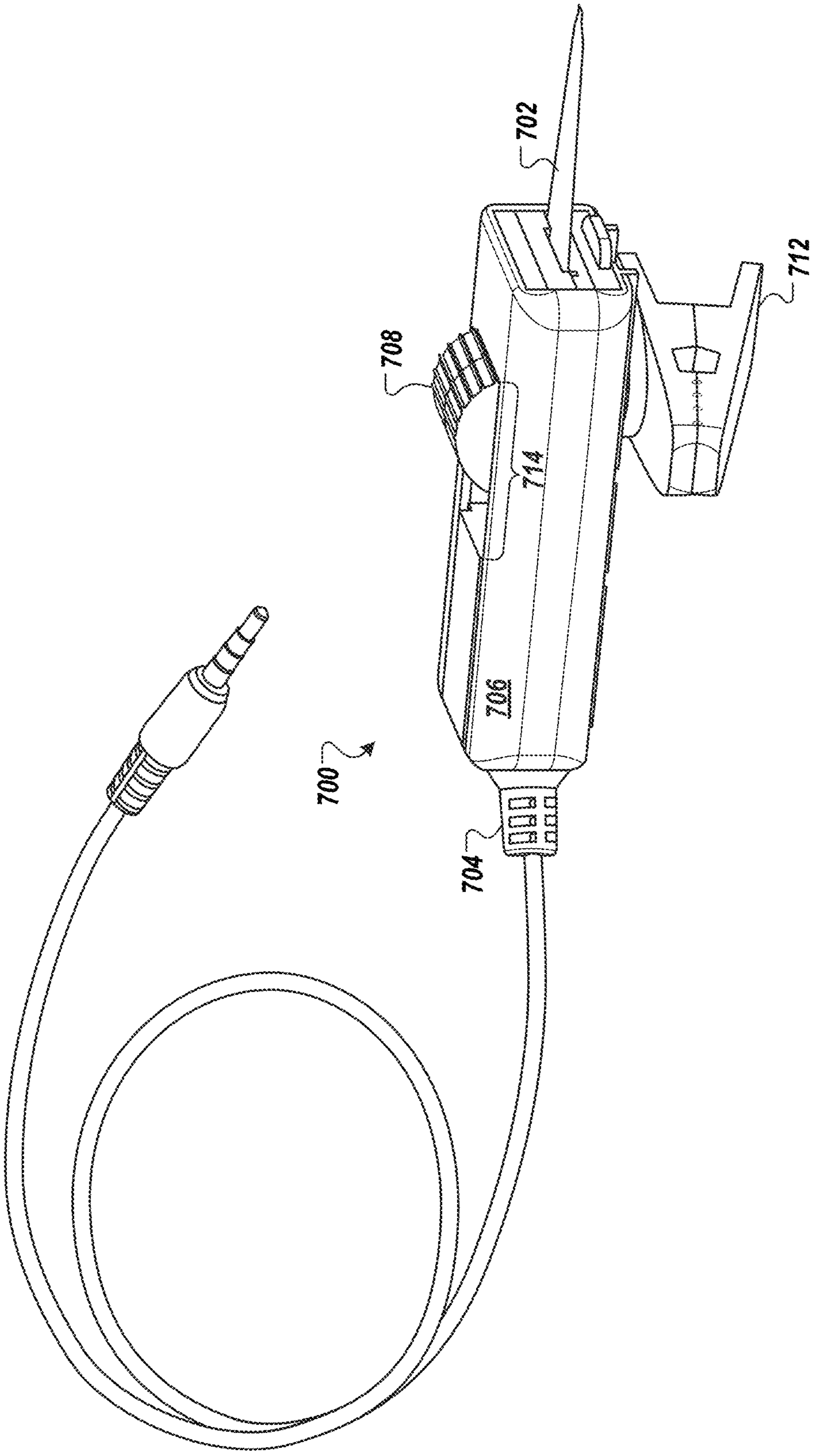
FIG. 7A through FIG. 7C illustrate a second example connector for interfacing flexible circuitry with another apparatus.
Figure 7B:
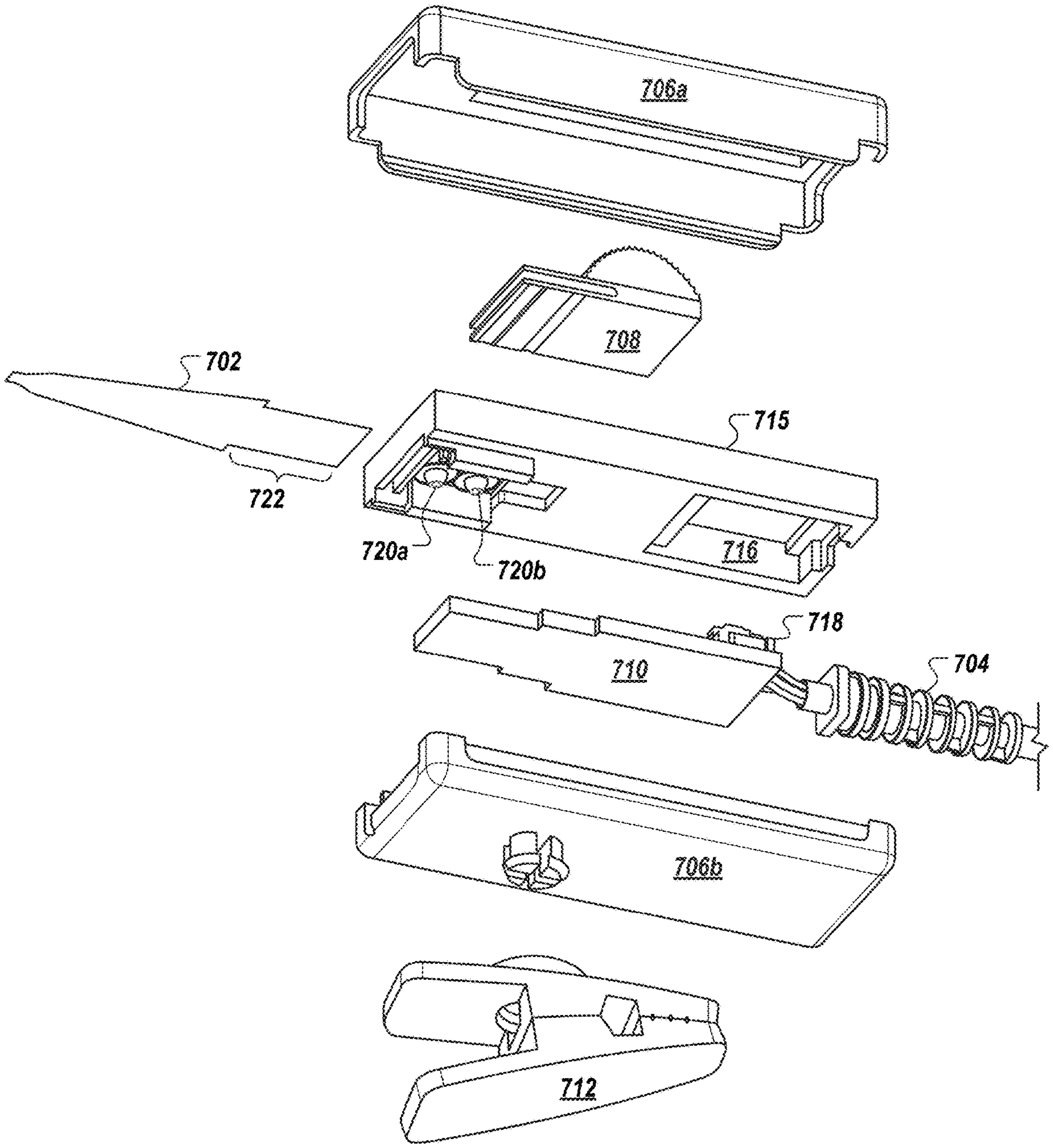
Figure 7C:
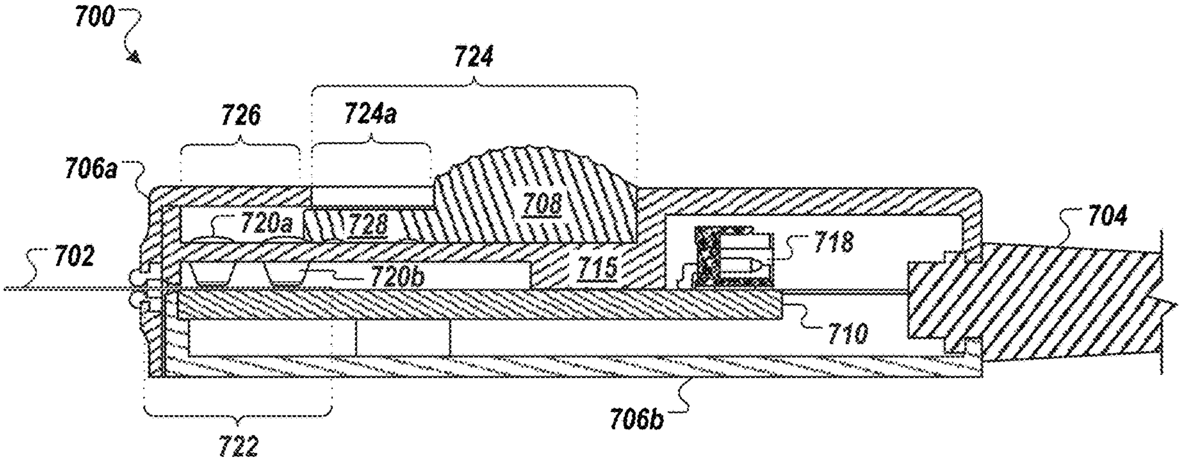

FIG. 7A through FIG. 7C illustrate a second example connector 700 for interfacing a flexible circuitry connection portion 702 with another apparatus via an electrical cord 704. Similar to the connector 100 of FIGS. 1A and 1B, the connector 700 may include a retention device 712 (e.g., alligator clip) to maintain a position of the connector 700 against apparel of a wearer.

As illustrated in FIG. 7A, a slider button 708 is disposed in an upper portion of a housing 706 of the connector 700. The slider button 708, for example, may be configured to move back and forth within an aperture 714 of the housing 706. Turning to FIG. 7B, the slider button 708 is configured to mate with a membrane 715 that presses into an upper housing portion 706*a*. The membrane 715 includes a mating region 716 to receive a data interface (e.g., socket) 718 of the electrical cord 704 and surround the mating between the socket 718 and the electrical cord 704, thereby rendering the electrical cord interface water resistant.

In some implementations, the membrane 715 includes a set of spring elements 720*a*, 720*b* (e.g., rubber protrusions). The spring elements 720*a*, 720*b*, for example, may be configured to exert a downward force against the flexible circuitry connection portion 702 upon insertion into the connector 700 and actuation of the button 708, thereby frictionally retaining the flexible circuitry connection portion 702 against a circuit board 710 (e.g., flexible circuitry, semi-rigid circuitry, etc.). A material, density, and/or geometry of the spring elements 720*a*, 720*b*, in some examples, may be selected to produce a desired frictional retention force on the flexible circuitry connection portion 702. Further, although illustrated as a pair of spring elements 720*a*, 720*b*, in other embodiments, a single spring element 720 may be used. In further embodiments, three or more spring elements 720 may be disposed on the bottom of the membrane 715.

In the illustrated embodiment, rather than two retention plates of circuitry, only the single circuit board 710 is provided, thereby lending the design most effective on dual-sided flexible circuitry connection portions and/or keyed flexible circuitry connection portions that encourage the user to insert the flexible circuitry connection portion in a preferred orientation (e.g., with contact pads pointed downward). However, in other embodiments, similar dual-retention plate designs as those illustrated in FIG. 2B and FIG. 2C, FIG. 6C, and/or FIG. 6D may be incorporated into the connector 700. Further, in certain embodiments, a bottom portion of the membrane 715 may include electrical contacts (e.g., at bottoms of the spring elements 720*a*, 720*b*) and electrical traces for providing signals between upwardly pointed contact pads of the flexible circuitry connection portion 702 and the data interface 718. For example, each of the spring elements 720*a*, 720*b* may include a conductive rubber portion electrically in communication with a conduction path between a bottom of the membrane 715 and a top of the circuit board 710.

Turing to FIG. 7C, a side cut-away view of the connector 700 illustrates an end portion 722 of the flexible circuitry connection portion 702 inserted between the circuit board 710 and the spring elements 720*a*, 720*b* of the membrane 715. As illustrated, a button aperture 724 for the button 708 includes an open region 724*a* for providing travel for the button 708. Upon sliding the button 708 into the open region 724*a* of the aperture 724, for example, an extension portion 728 of the button 708 will move into an open region 726 between the upper housing 706*a* and the membrane 720*a*, thereby exerting force downward upon the spring elements 720*a*, 720*b* and creating a frictional retention force against the end portion 722 of the flexible circuitry connection portion 702.

Figure 8A:
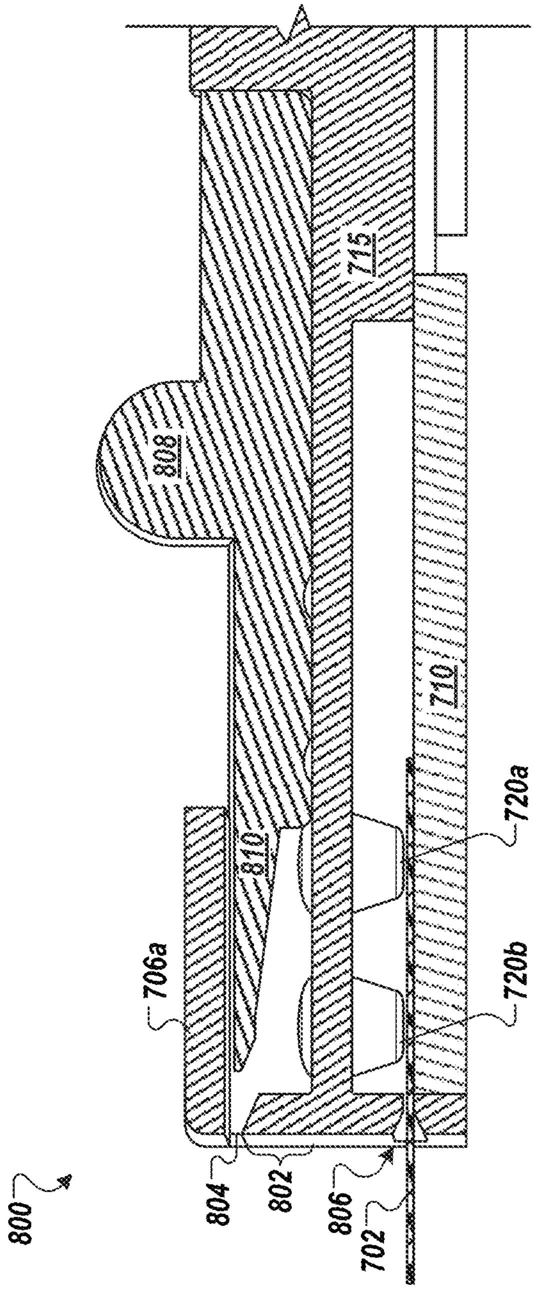
FIG. 8A and FIG. 8B illustrate, respectively, a release position and a retain position of an alternative button and membrane design for the second example connector.
Figure 8B:
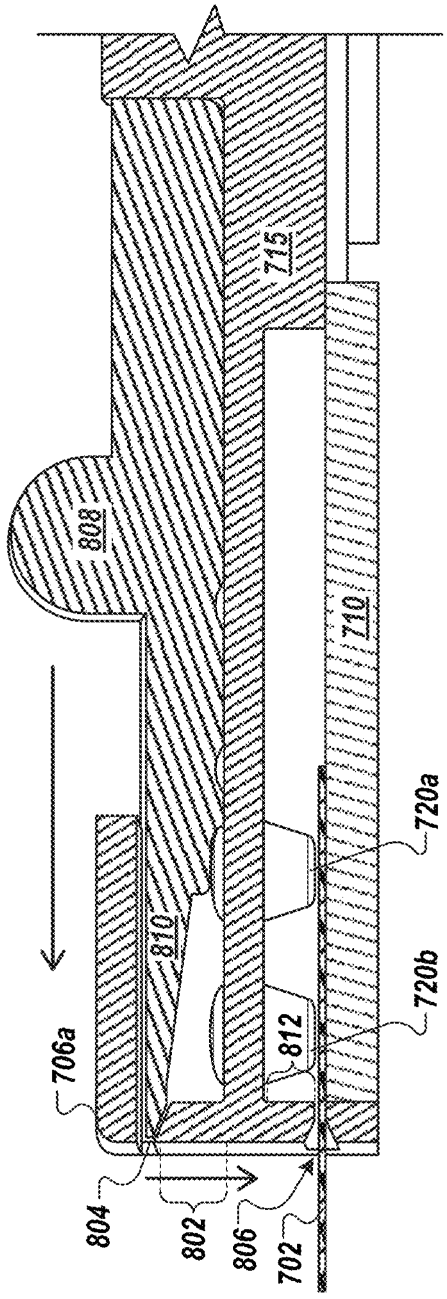

Turning to FIG. 8A and FIG. 8B, in some implementations, the connector 700 of FIG. 7A through FIG. 7C includes a slider button 808 having a wedge-shaped extension 810. Further, the membrane 715 includes a vertical extension 802 extending upwards away from an aperture 806 for receiving the flexible circuitry connection portion 702. The vertical extension 802 has an angled upward edge such that, as it extends toward a lower surface of the upper housing portion 706*a*, it creates a triangular space 804 between the vertical extension 802 and the upper housing portion 706*a* configured to receive a tip of the wedge-shaped extension 810 of the button 808.

Turning to FIG. 8B, when the slider button 808 is pushed forward toward the aperture 804, in addition to generating a downward force that moves the spring elements 720*a*, 720*b* into engagement with the flexible circuitry connection portion 702, the tip of the wedge-shaped extension 810 of the button 808 engages on top of the vertical extension 802 of the membrane 715, forcing the membrane 715 downward such that a downward projecting extension 812 of the membrane 715 engages the flexible circuitry connection portion 702, further contributing to both the frictional retention of the flexible circuitry connection portion 702 and the waterproofing/water resistance of the connector 700.

In some implementations, in addition to providing electrical and/or data connection between a flexible circuitry device and an apparatus, connectors as described herein may include additional circuitry to perform signal conditioning, collection, and/or analysis. For example, resistors, capacitors, operational amplifiers, and/or other circuitry for signal conditioning of physiological sensor data may be designed into the upper retention plate 210*a* and/or lower retention plate 210*b* of the connector 100 of FIGS. 1A, 1B, and 2A through 2E and/or the connector 700 of FIGS. 7A and 7B. Turning to FIG. 3A, for example, the data path through the upper retention plate 210*a* to the data interface 214 may include a loop through conditioning circuitry of the lower retention plate 210*b*, such as circuit elements 308*a-d* (labeled in FIG. 3B).

While certain embodiments have been described, these embodiments have been presented by way of example only and are not intended to limit the scope of the present disclosures. Indeed, the novel methods, apparatuses and systems described herein can be embodied in a variety of other forms; furthermore, various omissions, substitutions and changes in the form of the methods, apparatuses and systems described herein can be made without departing from the spirit of the present disclosures. The accompanying claims and their equivalents are intended to cover such forms or modifications as would fall within the scope and spirit of the present disclosures.

What is claimed is:

1. A connector for interfacing a flexible circuitry device with an apparatus, the connector comprising:

- a housing comprising an upper housing portion and a lower housing portion, wherein the upper housing portion comprises a button region;
- a button configured to be actuated via the button region of the housing and configured to be movable between a retain position and a release position;
- one or more circuit boards, wherein
  - at least one first circuit board of the one or more circuit boards comprises at least one first contact configured to interface with a corresponding at least one second contact of a connection portion of the flexible circuitry device, wherein
    - the at least one first circuit board is disposed between the button and the lower housing portion, and
  - at least one second circuit board of the one or more circuit boards comprises at least one third contact, each third contact supporting transfer of power, data, and/or stimulation signals between the flexible circuitry device and a cable;
- a plurality of retention features for frictionally retaining the connection portion of the flexible circuitry device against the at least one first contact, wherein the plurality of retention features comprises
  - a lower retention plate, and
  - an upper retention plate; and
- a cable connector in electrical communication with the at least one third contact, wherein the cable connector is configured to enable transfer of data and/or stimulation signals between the cable and the flexible circuitry device;

wherein, when the button is in the retain position, the button creates a downward force on the upper retention plate toward the lower retention plate, the downward force being configured to cause a frictional retention force against the connection portion of the flexible circuitry device when the at least one second contact of the connection portion of the flexible circuitry device is communicatively aligned with the at least one first contact of one or more circuit boards of the at least one first circuit board; and wherein, when the button is in the release position, the upper retention plate is displaced in a direction of the upper housing portion, thereby creating an aperture configured to receive the connection portion of the flexible circuitry device.

2. The connector of claim 1, wherein the lower housing portion comprises a recess for receiving a lower portion of the one or more circuit boards.

3. The connector of claim 1, wherein:

the lower housing portion comprises at least one projection; and when the button is in the release position, an upper portion of the at least one first circuit board is pivoted at an angle about the at least one projection.

4. The connector of claim 1, wherein the button region comprises a button aperture.

5. The connector of claim 1, wherein the button is configured to slide substantially parallel to the at least one first circuit board.

6. The connector of claim 1, further comprising the cable.

7. The connector of claim 1, wherein the at least one first circuit board comprises one or more of the at least one second circuit board.

8. The connector of claim 1, wherein, when in the retain position, at least a portion of the button is vertically aligned with at least a portion of the upper retention plate.

9. The connector of claim 8, wherein the portion of the button comprises a horizontal extension of the button.

10. The connector of claim 1, wherein the button is configured to be depressed toward the at least one first circuit board.

11. The connector of claim 10, further comprising at least one spring disposed beneath an upper surface of the button such that, when the button is depressed, the at least one spring compresses, and when the button is released, the at least one spring exerts an upward force against the button.

12. The connector of claim 11, wherein the at least one first circuit board comprises a spring aperture.

13. The connector of claim 1, wherein the plurality of retention features comprises one or more first contacts of the at least one first contact.

14. The connector of claim 13, wherein the plurality of retention features comprises at least one leaf spring electrical contact.

15. The connector of claim 1, wherein a printed circuit board assembly comprises the one or more circuit boards.

16. The connector of claim 15, wherein the printed circuit board assembly comprises:

the lower retention plate;

the upper retention plate; and a bridge section connecting the upper retention plate to the lower retention plate.

17. The connector of claim 16, wherein:

the upper retention plate comprises an upper portion of the at least one first contact; and the lower retention plate comprises a lower portion of the at least one first contact.

18. The connector of claim 17, wherein the bridge section comprises electrical connections for enabling electrical communication of signals from the upper portion of the at least one first contact to the cable connector.

19. The connector of claim 18, wherein the upper portion of the at least one first contact mirrors a positioning of the lower portion of the at least one first contact such that the connection portion of the flexible circuitry device may be inserted into the connector in either orientation.

20. The connector of claim 18, wherein the electrical connections of the bridge section communicate electrical signals from the upper retention plate to signal processing circuitry of the lower retention plate.

21. The connector of claim 1, further comprising a flexible membrane disposed between the upper housing portion and the button, wherein the flexible membrane creates a water resistant seal surrounding at least a portion of the one or more circuit boards.

22. The connector of claim 21, wherein the flexible membrane comprises at least a portion of the plurality of retention features.

23. The connector of claim 1, wherein the flexible circuitry device is a wearable medical device.

24. The connector of claim 23, further comprising a retention device for releasably attaching the connector to an article of clothing.

* * * * *